Patented Jan. 12, 1932

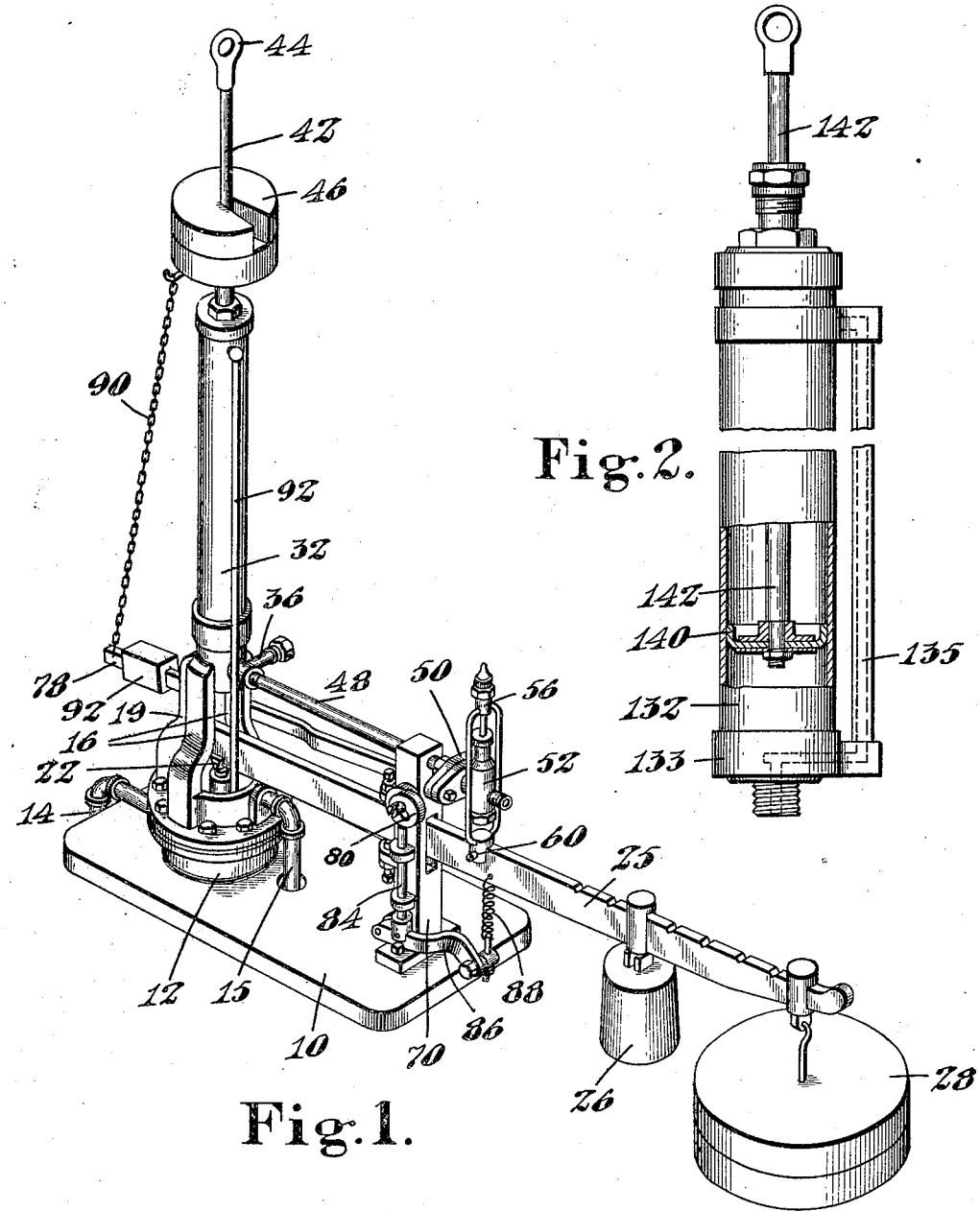

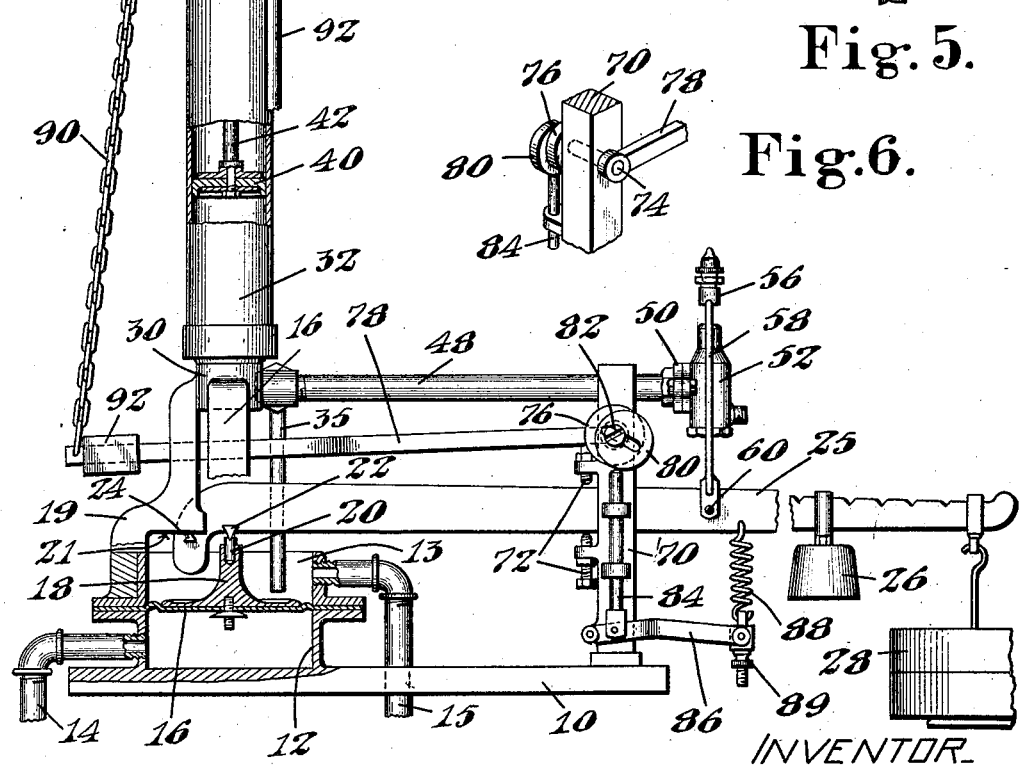

1,840,813

UNITED STATES PATENT OFFICE

WILLIAM A. HEANEY, OF SALEM, MASSACHUSETTS, ASSIGNOR TO LOCKE REGULATOR COMPANY, OF SALEM, MASSACHUSETTS, A CORPORATION OF MASSACHUSETTS

AUTOMATIC REGULATOR

Application filed January 5, 1928. Serial No. 244,705.

This invention relates to automatic regulators for pressure systems, and more particularly to fluid-operated regulators of the Locke type employing a damper operating motor and a pressure scale beam against which the pressure of the system is balanced and which serves to control the action of the motor in opening or closing a damper or other regulating device.

The object of my invention is to improve regulators of this type to secure a finer regulation, more reliable control and more perfect balance than has been possible heretofore. To this end, an important feature of my invention consists in balancing mechanism for the regulator pressure beam, including a spring connected to the beam at a point remote from its fulcrum and a motor controlled device of a novel character for varying the tension of the spring in such a manner as to balance the beam against the existing pressure fluctuation occuring in the system; that is to say, if the pressure in the system is increasing and the damper operating motor is beginning to act to check the increase, the balancing mechanism is operated in such a manner as to favor movement of the pressure beam in a direction for increasing the pressure. The action of the balancing mechanism is of a differential character, creating or building up a compensating force tending to retard action of the damper controlling mechanism in whatever sense the latter is beginning to act. The mechanism herein disclosed has been found particularly effective in preventing extremes of pressure fluctuation and may be relied upon to maintain the pressure of the regulated system constant within one-quarter of a pound or between any desired predetermined limits.

As herein shown, the damper controlling motor includes a fluid pressure cylinder to which water or air under pressure is admitted through a pilot valve controlled by the pressure beam. In accordance with another feature of my invention, the pressure cylinder is equipped with a leak-away valve which permits constant draining of the pressure cylinder at a very slow rate and in a manner which compensates or offsets to a controllable degree the effect of the air or water admitted to the cylinder. This feature is important in that it affords a convenient means for regulating the action of this element of the regulator in securing the more precise and accurate action thereof which the present invention contemplates.

Another novel feature of my invention consists in an improved controlling element having a continuous cam face for establishing and maintaining an even and definite balance on the regulator mechanism as hereinafter described, this element preferably being a rotary cam having a novel bodily adjustment for a purpose also hereinafter described.

A further feature of the invention consists in a pilot valve of novel construction, particularly suited for use in an automatic regulator for controlling the supply of water or air to the damper operating motor.

These and other features of the invention will be best understood and appreciated from the following description of a preferred embodiment thereof, selected for purposes of illustration and shown in the accompanying drawings, in which Fig. 1 is a view in perspective of the regulator;

Fig. 2 is a view in elevation of a motor cylinder of modified form;

Fig. 3 is a view in elevation, partly in section, of the regulator;

Fig. 4 is a sectional view of the leak-away valve and associated parts;

Fig. 5 is a sectional view of the pilot valve; and

Fig. 6 is a detail view in perspective of a portion of the balancing mechanism.

The regulator comprises a base casing 10, upon which the various elements thereof are supported. A pressure chamber 12 is formed integral with the base and connected through a pipe 14 to the system in which it is desired to regulate the pressure. The upper end of the pressure chamber is closed by a diaphragm 16 carrying a pressure cap 18, in the upper end of which is mounted a short strut 20 of hardened steel having a V-groove in its upper surface. Above the pressure chamber 12 is located an overflow chamber 13, drained by a pipe 15. A three-legged stand or bracket 19 is secured to the walls of the overflow chamber and one of these legs is provided with a transversely extending horizontal face 21, against which bears the hardened fulcrum 24 of the pressure scale beam 25. The beam 25 carries a hardened knife edge 22 which rests in the V-groove of the strut 20 so that when the pressure in the pressure chamber 12 is sufficient to lift the diaphragm 16, the pressure beam 25 will be raised at its outer end. Weights 26 and 28 are provided upon the beam 25 and these may be adjusted in accordance with the range of pressure being dealt with.

At its upper end, the bracket 19 is provided with a hub 30, internally threaded to receive the end of the fluid pressure cylinder 32 and having also a threaded outlet 34 having connection with a leak-away valve 36. Within the cylinder 32 is located a piston 40, carrying an operating rod 42 which extends out through the upper head of the cylinder, where it is provided with an eye for connection with the damper to be controlled. The operating rod 42 carries also weights 46, tending always to move the piston down in opposition to the pressure of the admitted fluid. An overflow pipe 92 is tapped into the upper end of the cylinder 32 and so disposed as to carry any fluid working past the piston 40 to the overflow chamber 13.

Water or compressed air is admitted to the lower end of the cylinder 32 through the pipe 48, which is also tapped into the hub 30 and carries at its outer end a flange 50 to which is connected the flanged pilot valve 52. The valve stem 54 of the pilot valve is connected at its upper end to the hub 56 of a yoke 58, which is pivotally connected at its lower end by a pin 60 to the pressure scale beam 25. The arrangement is such that when the pressure beam 25 is lifted by increasing pressure in the system, the valve stem 54 is moved to open the valve and admit fluid to the cylinder 32. The piston is thereupon elevated and the controlling damper moved in such fashion as to check the draft.

The balancing mechanism of the regulator will now be described. The base 10 carries a stand or support 70, having a transverse aperture through which the beam 25 projects and supports at its upper end the pipe 48. It also carries a pair of adjustable stop screws 72, by which the amplitude of vibration of the beam 25 may be limited in accordance with the movement in the pilot valve stem. The support 70 has also bearings for a transverse shaft 74, having at one end a flat head or disk 76 and being connected at its rear end to an operating arm 78 by which the shaft is oscillated, for a purpose which will presently appear. The disk 76 is concentrically disposed with respect to the axis of the shaft 74 and carries upon its face a cam disk 80. The cam disk is slotted and adjustably retained upon the disk 76 by a clamping screw 82. It will be apparent that the cam disk 80 may be set concentrically with respect to the axis of the shaft 74 or may be adjusted eccentrically to the limit permitted by its slot and its throw varied in this manner.

The support 70 carries on its front face a pair of lugs forming vertical bearings for a cam rod 84, bearing at its upper end against the cam disk 80 and pivotally connected at its lower end to a spring lever 86 near the fulcrum of the latter so that the effect of the lever is substantially to multiply the throw of the cam disk 80. The spring lever 86 is pivotally mounted upon the support 70 at its inner end and adjustably connected at its outer end to a spring 88. The spring 88 is connected to the pressure scale beam 25 at a point remote from its fulcrum and outside its point of connection to the pilot valve 52. At its lower end, the spring 88 is connected to a threaded stud, which is adjustably mounted in the end of the spring lever 86 and provided with an adjusting nut 89 by which the initial tension of the spring 88 may be set.

The operating arm 78 is connected at its outer end to the damper operating rod 42 through a chain 90 and is provided also with a sliding weight 92, which may be set as desired. It will be apparent that as the piston 40 is elevated, the pressure beam 25 having lifted, the operating arm 78 will be swung upwardly at its outer end and the cam disk 80 oscillated to depress the cam rod 84 and increase the tension of the spring 88. This is effective in opposition to the pressure which is tending to hold the pressure beam in elevated position, so that the beam is depressed and the valve 52 closed sooner than it would otherwise be and before the occurrence of a pressure drop in the system of a degree otherwise necessary to effect the action of the regulator.

The construction of the leak-away valve is shown in detail in Fig. 4. The inlet of the valve comprises a needle passage communicating with the chamber in the hub 30, while its transverse outlet passage communicates with the drain pipe 35 leading to the overflow chamber 13. The outer end of the valve is closed by a cap 37, through which passes a threaded spindle 39 with a slot at its outer end and a needle point at its inner end by which the inlet port of the valve may be regulated with any desired degree of nicety and the rate of downward movement of the plunger 40 controlled.

The construction of the pilot valve is best shown in Fig. 5, from which it will be apparent that this comprises a casing having a longitudinal bore with a transverse inlet opening 61 and a transverse outlet opening 62. Both ends of the longitudinal bore are closed with caps and tightly fitted into the bore is a single elongated cylindrical plug 63, having a longitudinal bore for the valve stem 54 and a transverse passage 64 registering with the outlet passage 62. Below the transverse passage 64, the longitudinal bore of the plug 63 is reduced in diameter to receive the reduced pilot end 65 of the valve stem. A seat is formed for the shouldered end of the valve stem 54 at the lower side of the transverse passage 64, so that when the valve stem is in the position shown in Fig. 5 the reduced end 65 fills the lower end of the bore and the valve is closed. The valve stem is provided at its upper end with a ball, which is received in a socket in the hub 56 of the yoke 58, this connection insuring positive movement in both directions of the valve stem under the operation of the yoke.

It is obvious that there is a point of balance somewhere on the face of the cam disk 80 and that the rod 84 normally rests on this point. An increase of pressure on the diaphragm 16 causes the beam 25 to rise and through the valve 52 cause the operating rod 42 to rise. The arm 78 is thus lifted and rotates the cam 80, which acts to distend the spring 88 and aid in closing the valve 52 and prevent excess movement of the rod 42. During such movement, the mechanism will automatically find the point of balance on the cam face of the disk 80 and the mechanism will normally remain in such balanced position with the rod 84 engaging this point. It will be clear that an accurate balanced pressure will thereby be maintained within the pressure chamber 12 and that any variation in such pressure will be immediately and automatically compensated and that the mechanism will quickly find the balance point and normally remain in such position.

I desire to emphasize particularly certain of the novel features of my improved regulator whereby I am enabled to secure a smooth, accurate, definite and a perfectly balanced control. The reason for such control lies primarily in the smooth and continuous cam face of the disk 80 against which the rod 84 always finds the point of balance and thereby maintains a constant pressure in the pressure chamber 12. I am aware that heretofore pressure regulators have been made which use a controlling member having a stepped cam face and I am very familiar with such regulators and their operation. The controlling members of these regulators have as many contact levels as there are steps and the point of balance above referred to is substantially always between two of these levels or steps. The result is that in its normal operation this controlling member is constantly moved back and forth in a "hunting" action over two adjacent steps in the attempt of the regulator to find the balance point, which is located at a level between these two steps. Obviously, such operation of the regulator, instead of maintaining a uniform and constant pressure, causes a fluctuating and unreliable pressure which is most undesirable and useless for many purposes. As distinguished from such a regulator, the acting cam face of my controlling member 80 provides a definite point of control for all pressures and thereby maintains a uniform and reliable pressure and eliminates the "hunting" and fluctuating action heretofore experienced.

I desire, furthermore, to call particular attention to the operation and valuable function performed by my adjustable cam disk 80. When the device is initially installed, the spring 88 must be placed under a definite tension when the regulator is in its initial position and, furthermore, rotation of the disk must act to distend the spring sufficiently to properly check upward movement of the beam 25. As best seen in Fig. 3, my adjustable cam arrangement permits me to adjust the disk 80 bodily to increase or diminish its eccentricity without changing the initial tension on the spring 88. This is a very important feature of the invention since such an adjustment is always necessary when installing or adjusting the device and it is essential that changing of the eccentricity of the disk 80 to place a greater or less tension on the spring 88 for a given rotation of the disk shall not vary the tension on the spring when the disk is in its initial position.

As shown in Figs. 1 and 3, the regulator is organized to lift the damper operating rod 42 when water or compressed air is admitted through the pilot valve 52. In some installations, however, it is more convenient to arrange the movement of the damper operating rod in the opposite direction and a construction suitable for such operation is shown in Fig. 2. The cylinder 132 is, in this case, provided with a head 133, having a transverse outlet communicating with a pipe 135 leading to the upper end of the cylinder so that the operating fluid is admitted to the cylinder above the piston 140 instead of below it, as in the construction first described. Either cylinder 32 or cylinder 132 may be used as desired without modifying other parts of the regulator.

Having thus described my invention, what I claim as new and desire to secure by Letters Patent is:

1. In a regulator, a rotary member, an operating arm connected thereto and extending outwardly therefrom, a disk superposed on the member and having a slot therein, means extending through the slot and engaging the member, the slot permitting bodily adjustment of the disk transversely of the rotary axis of the member to different positions of eccentricity on the member and the same means being adapted to hold the disk in its adjusted position, and a valve controlling member engaging the edge of the disk and adapted to be operated by the rotation thereof.

2. In a pressure controlling mechanism, the combination of a regulator pressure beam, means including a diaphragm within a closed chamber for raising the beam, variable weights on the beam for resisting such raising movement, a controlling motor, a valve therefor, means mechanically connecting the valve to the beam, a rotary member having a continuous cam face, means including a pivoted member engaging the cam face and having a tension spring connecting it to the beam to pull the beam downwardly as the cam is rotated, and a connection between the member and motor for automatically rotating the member as the motor is actuated under the action of fluid pressure passing thereto through the valve.

WILLIAM A. HEANEY.